United States Patent [19]

Worth et al.

[11] 3,851,980
[45] Dec. 3, 1974

[54] TUBING CONNECTOR

[76] Inventors: Lewis R. Worth, 21 E. Greenbriar Dr., Deerfield, Ill. 60015; Maynard H. Cheris, 2485 St. Johns, Highland Park, Ill. 60035

[22] Filed: Apr. 19, 1974

[21] Appl. No.: 462,246

[52] U.S. Cl............... 403/172, 108/159, 52/758 H, 403/292, 403/298
[51] Int. Cl............................................ E04g 7/00
[58] Field of Search ........... 403/295, 298, 171, 172, 403/174, 176, 178, 173, 177; 108/153, 159; 211/182; 52/758 H

[56] References Cited
UNITED STATES PATENTS
| | | | |
|---|---|---|---|
| 3,004,784 | 10/1961 | Selby .............................. | 52/758 H |
| 3,089,716 | 5/1963 | Berkowitz ......................... | 52/758 H |
| 3,638,803 | 2/1972 | MacMillan......................... | 108/159 |

*Primary Examiner*—Andrew V. Kundrat
*Attorney, Agent, or Firm*—Alter, Weiss, Whitesel & Laff

[57] ABSTRACT

A tubing connector comprises a member in the form of an elbow, T. Y, or the like. At least some arms of the member have a plurality of rows of ratchet-like teeth extending parallel to the axis of the arm, with the rows arranged parallel to each other and separated by aisles of standard width. A ring, preferably decorative, having an external tab thereon, includes at least one internal tooth which matches with and passes down one of the aisles as the ring is slipped over the arm. Hence, the ring may be slipped off the arm, rotated to any of many alternative angular settings, and then slipped back onto the arm with the tab positioned to support a glass table top, or the like. A tubular side rail may then be slipped on over each of the arms and be held in place by the ratchet teeth. By changing decorative rings, the total appearance may be completely altered.

18 Claims, 9 Drawing Figures

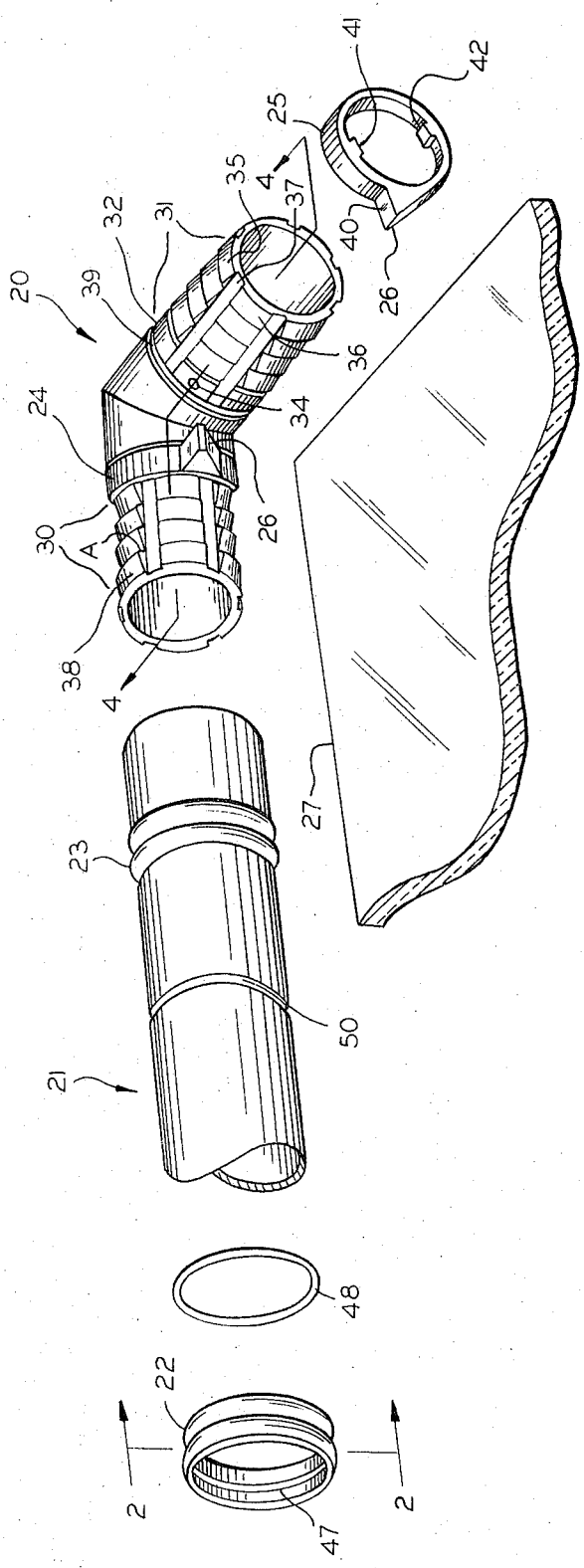
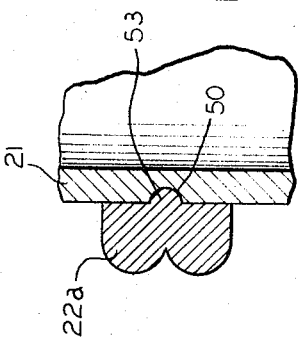
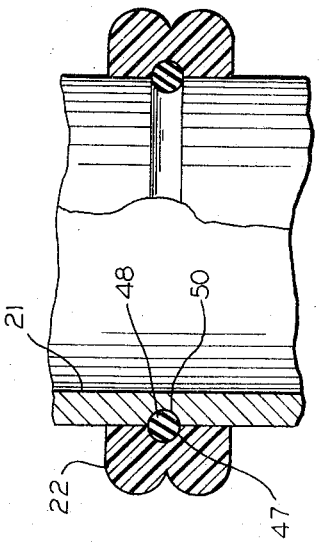

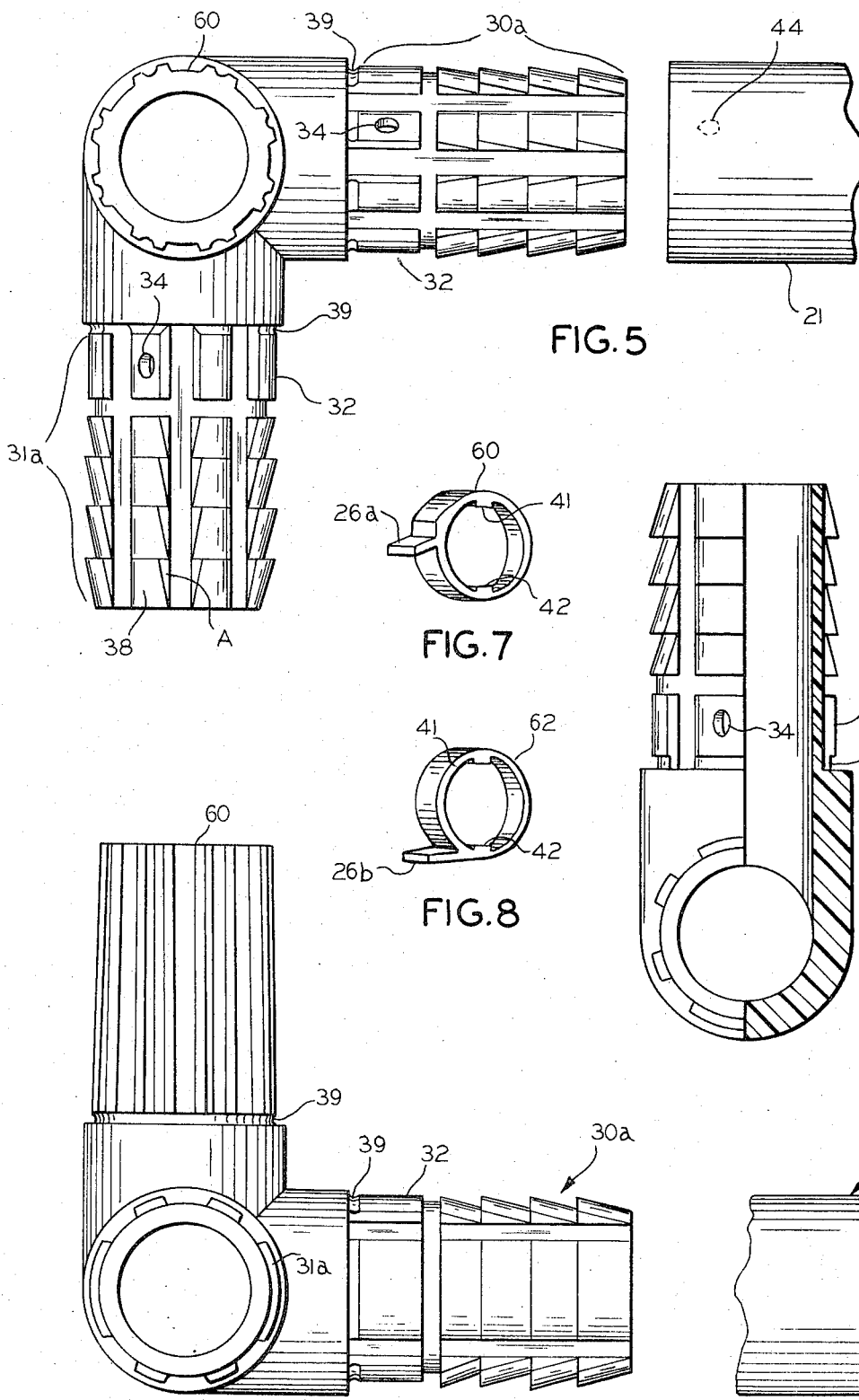

TUBING CONNECTOR

BACKGROUND OF THE INVENTION

This invention relates to modular furniture and more particularly to connector means for joining together tubular frame elements.

While the invention may find many uses, it is herein described as providing a corner element for completing the frame of a glass topped table. However, this specific description of use is not to be taken as a limitation upon the invention. The invention is drawn to a part having many uses in a great variety of applications, such as, racks, seats, desks, shelves, cabinets, and the like.

Heretofore, the modular elements used in furniture construction of the described type have tended to be made for each specific application. For example, a typical glass top table requires an elbow at the corner of a frame having a tab for supporting the glass. To locate the glass top at a different position relative to the frame, the tab must be located at a different position. When the elbow is molded, this could require a separate mold for each variation. Moreover, several different table constructions would be required for tops of various heights. In short, the prior art devices lacked flexibility.

Accordingly, an object of the invention is to provide new and improved modular furniture design. Here, an object is to provide a flexible module which may have any of many uses. In particular, an object is to provide a module having an adjustable tab.

Another object of the invention is to provide a corner module and cooperating side part which together form a flexible design approach that may give any of many different appearance effects.

Still another object is to provide a modular connector member of improved mechanical design which eliminates problems heretofore troublesome.

Yet another object is to provide modular furniture connectors which lend themselves to use with a plurality of different design appearances.

Further objects will be manifest from the description, drawings and claims.

SUMMARY OF THE INVENTION

The modular connector comprises a tubular member in the form of an elbow, T, V, Y, or the like. At least one arm of the member has a plurality of longitudinally extending rows of ratchet-like teeth with the rows extending in a spaced parallel relationship, parallel to the axis of the arm. The rows are separated by aisles of standard width. A ring is provided which has a tab thereon and one or more internal teeth which match with and pass down the aisles. The ring may be decorative, if desired. The tab may be rotated to any one of several alternative angular settings and then slipped over the arm with the internal teeth passing down the aisles. After the ring is in place, a tubular side rail is slipped on over the arm, and the ratchet teeth keep the rail from slipping off. In this way, for example, four side rails and four elbows may be assembled to make a rectangular frame for receiving a glass top supported on the tabs of the rings.

Other decorative rings may also be provided to match the decoration on the ring with the tab, thereby enabling a complete design to be assembled over the entire frame. By changing the rings, the total decorative effect may be completely altered.

BRIEF DESCRIPTION OF THE DRAWINGS

FIG. 1 is an exploded view of the inventive connector together with an examplary fragment of a side rail and a corner of a glass table top;

FIG. 2 is a cross-section of a ring taken along line 2—2 of FIG. 1;

FIG. 3 is a fragmentary cross-section similar to FIG. 2, which shows a different form of decorative ring;

FIG. 4 is a partly cross-sectional view showing the connector of FIG. 1 cut along line 4—4 thereof;

FIG. 5 is a plan view of a three arm connector, which is somewhat similar to the two arm connector of FIGS. 1–4;

FIG. 6 shows essentially the same connector as shown in FIG. 5, rotated by 90°;

FIG. 7 is a perspective view of an alternative embodiment of the ring shown in FIG. 1;

FIG. 8 is a perspective view of another alternative embodiment of the ring shown in FIG. 1; and FIG. 9 is a perspective view of the end of a side rail, showing a detent therein for attachment of the side rail to the inventive connector.

DESCRIPTION OF THE PREFERRED EMBODIMENT

The corner of an exemplary glass top table (FIG. 1) includes the inventive connector 20, a side rail 21, a pair of decorative rings 22, 23, a pair of tab rings 24, 25 each with a tab 26, and a glass table top 27. The connector 20 of FIG. 1 has two arms 30, 31 which have a shape and size that slips snugly into an inside socket or bore in the preferably hollow, tubular side rail 21, and a similar side rail (not shown) for arm 31. Rings 24, 25 slip over arms 30, 31. Ring 24 is shown as having already been slipped over arm 30. Ring 25 will slip onto arm 31 and come to rest on a seat area 32.

Each arm 30, 31 includes a plurality of rows of ratchet teeth (two of which are numbered 35, 36), each row being separated from its neighbor rows by aisles (one of which is numbered 37). The rows are arranged on the surfaces of the arms in a spaced parallel relationship, parallel to the axis of the arm. Each ratchet tooth (one of which is numbered 38) is an inclined plane projecting away from the surface of side rail in a direction which enables the side rail tube 21 to slip on over the teeth and partly compress them. The angle of one such inclined plane is identified by the letter A (FIG. 5). The apex of the angle A points toward the side rail 21. As the socket or bore inside rail 21 slips easily over the arm 30, the teeth 38 tend to be compressed and to bite into the inside bore of side rail 21, to prevent it from being easily removed.

At the root or innermost end of the arms 30, 31, a circumferential groove 39 forms a clearance space for giving relief if any chips, burrs, or debris appear in front of the advancing end of side rail 21 as it is pushed onto the connector arm.

A series of decorative rings may be provided, for giving any desired appearance to the structure. For example, one such appearance may be that of bamboo, and the rings may have an apperance similar to a bamboo joint. Another appearance might be that of twine or a thong for tying the parts together. Still other designs will readily occur to those who are skilled in the art.

One form 24 or 25 of the rings has a tab 26 for holding or supporting the glass table top 27. In greater detail, the ring 25 (for example) includes an external tab 26 having a flat or planar surface 40 for receiving and supporting an edge or corner of the glass table top 27. Inside the ring 25 are one or more internal teeth 41, 42. Each internal tooth matches with and passes down an aisle 37 between adjacent rows of ratchet teeth 35, 36. As best seen in FIGS. 4–6, a seat area 32 may be formed at the inner end of each arm to receive and stably support a ring member 24, 25. The interference between teeth 41, 42 and the aisles 37 prevent rotation of the tab 26 under the weight of the glass.

Thus, by rotating ring 25, the external tab 26 may be placed in any one of many alternative positions. Because of this feature, if the elbow 20 were rotated clockwise about an axis through arm 31 by, say 90°, the ring 25 could also be rotated by 90° counterclockwise so that the tab 26 remains horizontal. This aspect permits the elbow to be used in various positions, rather than in only one position as was the case heretofore.

Because the ring 24 may be rotated, the aisles 37 are positioned at selected locations, around the circumference of the connector. Four equally spaced aisles may be employed, or where the connector is to be positioned in other than a horizontal or vertical position, alternative spacing of the aisles may be used. Rather than symmetrically located about the circumference of the ring, the teeth 41, 42 might also be fairly closely spaced and located on the ring at some selected position relative to the tab 26.

Accordingly, the circumferential aisle locations may be at virtually any selected positions, depending upon the needs of a given system.

A series of holes or recesses 34 may be positioned circumferentially around the seat region 32. This way, a detent or projecting tip 44 (FIG. 9) inside the side rail 21 may be slipped into the recess 34 in order to stabilize it against rotational displacement and to retain it in a locked position relative to the connector arm. If the seats 32 are made wide enough and the rings 24, 25 are made narrow enough the hole or recess 34 is not covered by the ring. Then, the detent 44 may be snapped into the recess 44 to lock together the entire unit. The relative locations of detent 44 and hole 34 depends upon the use intended. As shown in FIG. 5, the detent locks the units together when the ring 25 is not used. The locations could also be selected to lock together the units when ring 25 is used, or alternatively when the ring 25 either is or is not used.

FIGS. 7 and 8 have been drawn to show that greater flexibility of design is possible by the substitution of alternative rings 60 and 62. In FIG. 7, the tab 26a is located near the top of the ring so that table top 27 rests near the upper part of the frame. In FIG. 8, the tab 26b is positioned much lower on the ring so that the glass top 27 will be near the bottom of the frame. If the two rings 60 and 62 are used together on the same arm 30, 31, there are upper and lower tabs with a clearance space between them. A shelf approximately as thick as the clearance space may be slipped in between the tabs. All of these rings are interchangeable to provide an adjustability to the tubing connector of this invention.

To coordinate the over all design of the entire frame with the appearance of ring 25, when it is decorative in nature, other matching or contrasting decorative rings 22, 23 may be slipped on over the outside periphery of the side rail 21. Preferably, each of these rings has an outside contour of decorative apperance (here a bamboo joint). An inside recess 47 partially receives an O-ring 48 made of any suitable material, such as soft rubber. The ring 22 and O-ring 48 slip on over the outside of the rail 21. The soft rubber inside diameter edge of the O-ring guards the side rail against scratches. Mating circumferential grooves 50 may be formed in the side rail to receive the O-ring. Thus, as the decorative ring 22 is slipped over the side rail 21, the O-ring snaps into groove 50 to hold it in position. FIG. 2 shows the resulting assembled structure in cross-section.

Sometimes the cost considerations are such that the expense of inserting the extra part (O-ring 48) into ring 22 is undesirable. For these situations, the decorative ring 22a may be made with an integral keying embossment 53 inside the ring. However, this embossment would generally not be used if the side rail 21 is, for example, metal plated and susceptible to scratching. The embossment 53 drops into a groove, such as 50, to key and stabilize the organization.

The foregoing description has specifically described an elbow connector and mentioned that other shapes may also be used. By way of example, FIGS. 5, 6 show a three-way connector having arms 30a, 31a which correspond generally to the arms 30, 31 of FIG. 1. In addition, the embodiment of FIGS. 5, 6 includes a showing of fluted arm 60 which may be inserted into a vertical sid rail or a support such as a leg, or vertical post, for example. In a three-way connector molded from plastic, the fluted arm makes it easier to remove the connector from the mold.

The nature of the material used to make the elbow may vary according to the users needs. For example, it may be made of plastic, wood, or metal and may be molded, die cast, or fabricated. When plastic is used, it is preferably metal plated over ABS or polypropylene material.

Since those skilled in the art will readily perceive various modifications, the appended claims are to be construed to cover all equivalent structures.

I claim:

1. A tubing connector comprising a joining member having at least one arm with an outer surface bearing a plurality of rows of ratchet-like teeth, the rows being arranged in a spaced parallel relationship separated by aisles, ring means having an external tab and at least one internal tooth which matches with and passes down an aisle between two of said rows, when said ring is slipped over said arm, whereby the tab may be rotated to any of many alternative angular settings by the expedient of removing, rotating, and replacing the rings.

2. The connector of claim 1 and side rail means having therein a bore for receiving said arm, each of the ratchet teeth comprising an inclined plane projecting away from the surface of the side rail arm in a direction which enables the arm to slip into the bore and which resists removal of the arm from the bore.

3. The connector of claim 2 and groove means for providing circumferential clearance at the innermost end of the rows of the arm, said groove being positioned to receive any debris appearing in front of the advancing end of said side rails as it is pushed onto said arm.

4. The connector of claim 3 and means for receiving and supporting on said side rail a decorative ring.

5. The connector of claim 4, wherein said decorative ring has an O-ring and an internal groove for partially receiving said O-ring whereby the inside diameter of the O-ring guards the side rail against scratching while said decorative ring is slipped on over said side rail.

6. The connector of claim 2 wherein said connector has at least two mutually perpendicular arms, seat means formed on each of said arms to receive one of said ring means with a tab, said ring means being rotationally oriented on said connector so that the tab projects inwardly with respect to the perpendicular angle of said arms, whereby said tabs receive and support a table top.

7. The connector of claim 1 wherein said connector is an elbow having two mutually perpendicular arms, a pair of tubular side rails, each side rail having therein a socket for receiving a corresponding one of said perpendicular arms, each row of the ratchet teeth and each separating aisle extending longitudinally along the length of said arm, parallel to the axis of the arm, each ratchet tooth comprising an inclined plane projecting away from the surface of the side rail at an angle with the apex of the angle pointing toward a side rail to enable the arm to slip easily into the socket while resisting removal of the arm from the socket.

8. The connector of claim 1 and groove means at the root of said arm for providing circumferential clearance to receive any material pushed out in front of the advancing end of said side rails.

9. The connector of claim 1 and means on said side rail for receiving and supporting a decorative ring.

10. The connector of claim 9 wherein said decorative ring has an internal embossment for fitting into a groove circumferentially formed around the outside surface of said side rail.

11. The connector of claim 1 wherein said connector has at least two mutually perpendicular arms with one of said ring means with tab located on each of said arms in a position such that the tab on each ring means projects inwardly with respect to the perpendicular angle of said arms, to receive and support a table top.

12. The connector of claim 1 wherein there are a mutual perpendicular pair of said arms and a third and fluted arm perpendicular to said pair of arms.

13. The connector of claim 1 and means for stabilizing said ring means to preclude rotational displacement thereof under the weight of a table top.

14. The connector of claim 13 wherein the stabilizing means comprises a seat portion for receiving said ring.

15. The connector of claim 14 wherein the stabilizing means includes at least one recess in the seat portion and a projecting tip inside the side rail adapted to slip into the recess and to thereby lock together the resulting assembly.

16. The connector of claim 1 and a seat portion on said arm, a side rail for slipping on over said arm, and mating means for locking said side rail onto said arm.

17. The connector of claim 16 wherein said mating means is in position to lock said side rail onto said connector when said ring is not used.

18. The connector of claim 16 wherein said mating means is positioned to lock said side rail onto said connector when said ring is used.

* * * * *